United States Patent
Xu et al.

(10) Patent No.: US 9,317,334 B2
(45) Date of Patent: Apr. 19, 2016

(54) MULTILEVEL MULTIPATH WIDELY DISTRIBUTED COMPUTATIONAL NODE SCENARIOS

(75) Inventors: Mingqiang Xu, Shanghai (CN); Jun Su, Shangahi (CN); Gregory M. Burgess, Redmond, WA (US); Tianchi Ma, Sammamish, WA (US); Salim Alam, Mercer Island, WA (US); Rich Ciapala, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 648 days.

(21) Appl. No.: 13/026,218

(22) Filed: Feb. 12, 2011

(65) Prior Publication Data

US 2012/0209901 A1 Aug. 16, 2012

(51) Int. Cl.
  *G06F 15/16* (2006.01)
  *G06F 9/50* (2006.01)

(52) U.S. Cl.
  CPC ........ *G06F 9/505* (2013.01); *G06F 2209/5015* (2013.01)

(58) Field of Classification Search
  CPC ..... G06F 2201/86; G06F 9/505; G06Q 10/06; H04L 67/10; H04L 67/1025; H04L 67/32; H04L 63/08
  USPC ......................................................... 709/201
  See application file for complete search history.

(56) References Cited

U.S. PATENT DOCUMENTS 8,694,653 B2 * 4/2014 Wood et al. .................... 709/228
8,924,559 B2 * 12/2014 Brown ................... G06Q 10/10
                                                                  709/223
2005/0210109 A1 * 9/2005 Brown et al. ................. 709/206
2008/0080526 A1   4/2008 Gounares et al.
2009/0248693 A1 * 10/2009 Sagar ...................... G06F 17/30
2010/0057831 A1   3/2010 Williamson
2010/0125903 A1   5/2010 Devarajan et al.

(Continued)

OTHER PUBLICATIONS

Shinder, Debra Littlejohn., "10 reasons to use Azure for your cloud apps", Retrieved at << http://blogs.techrepublic.com.com/10things/?p=1282 >>, Jan. 6, 2010, pp. 5.

(Continued)

*Primary Examiner* — Kevin Bates
*Assistant Examiner* — Nazia Naoreen
(74) *Attorney, Agent, or Firm* — Aneesh Mehta; Kate Drakos; Micky Minhas (57) ABSTRACT

An application combines on-site and cloud-based calculations. The application selects a cloud computing broker from a list sorted by load. The broker receives computation requests from the application, sends corresponding load-balanced requests to local application service hosts and cloud proxies, receives responses, and sends the responses to the application without identifying the response source as local versus non-local. Each proxy has a logical-physical mapping of cloud-resident worker nodes. A scheduler receives session requests from applications, allocates local and cloud computing resources to a session, and tracks resource usage by session. An application previously run only on-premises can be executed partially on cloud worker nodes without modification. The proxy re-routes unfulfilled requests from a failed worker, undetected by the broker. If all workers assigned to that proxy fail, then the broker reassigns unfulfilled requests to another proxy, undetected by the application.

20 Claims, 3 Drawing Sheets

(56) References Cited

U.S. PATENT DOCUMENTS

| | | | |
|---|---|---|---|
| 2011/0016214 A1* | 1/2011 | Jackson | 709/226 |
| 2011/0282940 A1* | 11/2011 | Zhang et al. | 709/204 |
| 2012/0204187 A1* | 8/2012 | Breiter | G06F 9/5072 718/105 |

OTHER PUBLICATIONS

Hou, et al., "On the Mapping between Logical and Physical Topologies", Retrieved at << http://ieeexplore.ieee.org/stamp/stamp.jsp?arnumber=04808890 >>, First International Communication Systems and Networksand Workshops, Jan. 5-10, 2009, pp. 10.

"Flume User Guide", Retrieved at << http://archive.cloudera.com/cdh/3/flume/UserGuide.html >>, Version 0.9 1, Aug. 9, 2010, pp. 58.

Varia, Jinesh., "Architecting for the Cloud: Best Practices", Retrieved at << http://media.amazonwebservices.com/AWS_Cloud_Best_Practices.pdf >>, Jan. 2010, pp. 1-20.

Brodkin, Jon., "Application portability in cloud computing a work in progress", Retrieved at << http://www.networkworld.com/news/2010/042910-interop-application-portability-cloud.html >>, Apr. 29, 2010, pp. 3.

"Cloud computing", Retrieved at << http://en.wikipedia.org/wiki/Cloud_computing >>, Dec. 1, 2010, pp. 16.

"EC2 Site Architecture Diagrams—Cloud Computing Images", Retrieved at << http://www.cloudtweaks.com/2010/05/ec2-site-architecture-diagrams-cloud-computing-images/ >>, May 5, 2010, pp. 5.

"Introducing the Windows Azure Platform", Retrieved via << http://www.microsoft.com/windowsazure/?CR_CC=200002178&WT.srch=1&CR_SCC=200002178&WT.srch=1 >>, Oct. 2010, pp. 28.

\* cited by examiner

MULTILEVEL MULTIPATH WIDELY DISTRIBUTED COMPUTATIONAL NODE SCENARIOS

BACKGROUND

Cloud computing is internet-based computing in which shared computing resources such as processing power and digital data storage are provided on demand, and paid for according to their use, as is commonly done with electricity, water, and other utilities. Cloud computing sometimes takes the form of an application that a user can access and use through a web browser as if it were a program installed locally on the computer running the browser. The term "cloud" is used as a metaphor for the internet, which is sometimes depicted as a cloud in computer network diagrams. The front end of a cloud computing architecture is seen by end-users, namely, the customer's network or computer and the applications used on them to access the cloud via a user interface such as a web browser. The back end of the cloud computing architecture is the cloud, which may include various servers, routers, other computing devices, and data storage devices.

Many cloud computing infrastructures consist of services delivered through common data centers and built on servers. Commercial cloud computing offerings often provide quality of service guarantees. Sharing computing resources among multiple customers resources available despite variations in a given user's demands without buying enough to meet peak usage, and can also lead to more efficient resource utilization overall. Generally, cloud computing customers do not own the server hardware and other physical infrastructure, which allows them to avoid some capital expenditures. Instead, the customers rent computing resources from a cloud computing provider, and pay based on their usage of the resources. Many cloud computing offerings use a utility payment model analogous to traditional utility services such as electricity, while other offerings bill customers on a subscription basis.

SUMMARY

An architecture which allows a given application to combine calculations performed on-site with off-site cloud-based calculations faces challenges which arise from differences in the location and capabilities of on-site and cloud computers, and from the transient availability of cloud computers. Some embodiments described herein nonetheless provide a multilevel multipath widely distributed computational node architecture which can be employed to combine on-site and cloud computing resources for a given application.

Some embodiments include a cloud computing broker node having an application request-response interface, at least one application service host interface, and at least one wide distribution proxy interface. The broker node, like other nodes discussed herein, has a logical processor and a memory in operable communication with the logical processor. A premises transparency code resides in the broker node's memory. The broker node also has a request store and may have a load-balancing mechanism. The premises transparency code receives requests into the request store through the application request-response interface, sends corresponding (possibly load-balanced) computation requests through the application service host interface(s) and wide distribution proxy interface(s), receives computation responses from local nodes through the application service host interface(s) and from non-local nodes through the wide distribution proxy interface(s), and sends the computation responses through the application request-response interface without thereby identifying the source of the computation responses as being from a local node versus a non-local node.

In some embodiments, the broker node sends computation requests based on a prior allocation of local and widely distributed node computational resources by a node other than the broker node, e.g., by a head node discussed below. Some embodiments include multiple broker nodes, each having a load, and include a list of broker nodes in order according to their respective loads, allowing the application to choose between broker nodes.

Some embodiments include a wide distribution proxy node, which may also be part of a cloud computing architecture. A wide distribution proxy code resides in the proxy's memory. The proxy has a broker premises transparency code interface, a plurality of worker node interfaces, and a logical-physical worker node mapping of widely distributed (e.g., cloud-resident) worker nodes. The proxy code receives computation requests through the broker premises transparency code interface, sends the computation requests through the worker node interfaces using the mapping, receives computation responses through the worker node interfaces, and sends the computation responses through the broker premises transparency code interface.

Some embodiments include a head node having an application session interface and a scheduler code. The scheduler code receives session requests from applications through the application session interface, allocates local and cloud computing resources to a session, and tracks resource usage by a session. Because the broker node and/or proxy nodes provide intermediary management, the head node need not maintain a list of worker node physical identifiers.

Although each of the foregoing nodes can be viewed in isolation, the nodes are configured to communicate with one another. Accordingly, a given architecture may include a head node, one or more broker nodes, and one or more proxy nodes, for example. These nodes cooperate to provide an application with computational resources of local (a.k.a., on-site or on-premises) computer nodes and off-site (a.k.a., off-premises, non-local, cloud, or worker) computer nodes, in a manner which allows the application to ignore the location of those resources. One may execute an application at least partially on widely distributed worker nodes without modifying the application from a state in which the application was previously executed solely on local node(s).

Such architectures may be utilized in various ways. For example, after connecting a broker node to at least one wide distribution proxy node, and also to at least one local node, and also to at least one application node, the broker node receives multiple requests from the application node; the requests need not specify particular computing nodes. The broker sends corresponding computation requests to the proxy(ies) and to the local node(s), based on a prior allocation of local and widely distributed node computational resources by the head node. The broker receives computation responses from the proxy node(s) and the local node(s). The broker node sends the computation responses to the application node(s) without thereby identifying the source of the computation responses as being from a local node versus a non-local node.

In some embodiments, the proxy node(s) maintain a mapping of logical worker nodes to physical worker nodes, so the broker node sees (at most) logical names of worker nodes. In some embodiments, the proxy node monitors entries of the mapping for heartbeats, and marks an entry null after a given worker node misses a specified number of heartbeats. A replacement worker node will enter its own physical address in the mapping when it is ready to receive computation requests from the proxy node. The proxy node(s) receive computation requests from their broker node, send the computation requests to worker nodes, receive computation responses from the worker nodes, and send the computation responses to the broker node without thereby identifying any particular widely distributed worker node as the source of a given computation response.

In some embodiments, the broker node load-balances the computation requests sent to the wide distribution proxy node(s) and to the local node(s), thereby distributing computational workload among those nodes according to at least one predetermined load-balancing criterion. The relative loads of the wide distribution proxy node(s) and the local nodes are not necessarily known to the application node.

In some embodiments, the broker node reports resource usage to the head node's scheduler. An application node may get a list of broker nodes in the order of least loaded broker node first, and send its requests to the least loaded broker node, at least initially. In addition to tracking resource usage, in some embodiments the scheduler in a head node allocates resources for a session and then launches the resources (possibly bypassing the broker node) by transmitting, initializing, authorizing, invoking, and/or otherwise launching application service hosting code on local and non-local computing nodes.

In some embodiments, a proxy node re-routes one or more unfulfilled computation requests from a failed worker node to another worker node (also in the cloud), and the re-routing is undetected by the broker node. If a proxy node ascertains that all worker nodes assigned to that proxy node have failed, then the proxy notifies the broker node of their failure, and the broker node reassigns unfulfilled computation requests from that proxy node to another proxy node, and the reassigning is undetected by the application node.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Interest is growing in extensions of workloads for high-performance and other computing projects into cloud computing architectures. Some approaches focus on combining on-premise computing units with off-premise compute cycles for customers. Although hybrid on/off premise approaches are used as examples herein, aspects of the present teachings also pertain to purely off-premise platforms.

Regardless, challenges are involved in executing and trouble-shooting calculations in architectures using both on-premise nodes and nodes in a cloud. For example, cloud nodes may be different from the on-premise compute nodes. An application often runs in a different execution environment (e.g., different kernel, different installed components, different security) on-premise than off-premise. Calculation requests in the cloud may go through different network protocols and components from those of local compute nodes. As such, the underlying runtime system is challenged to hide the differences and complexities from the application so that the user can easily use the cloud resources without substantially rewriting the application.

Moreover, cloud nodes may be stateless, in that they come and go, creating difficulty for an approach which tracks some fixed set of nodes. If the node name changes, the node will not be tracked as a computational resource, causing valid nodes to be left unused and leading to under-utilization of the customer's purchased resources. In addition, multiple hops may be traveled from an on-premise application to the physical cloud nodes, leading to more recovery challenges.

Some embodiments described herein provide mechanisms that help address such problems. For example, challenges can be met by an ability to transparently offload calculations onto cloud workers, by spanning compute requests over on-premise as well as cloud nodes (for cloud burst and other scenarios), by mapping between logical nodes and physical nodes that can change, and by recovering from fatal node failures and re-routing requests to healthy nodes in multilevel request processing retries.

Some embodiments described herein may be viewed in a broader context. For instance, concepts such as node hierarchy, transparency, logical-physical mapping, error recovery, resource tracking, and/or load balancing may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and processes involving node hierarchy, transparency, logical-physical mapping, error recovery, resource tracking, and/or load balancing are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "node(s)" means "one or more nodes" or equivalently "at least one node".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "launching", "reporting", "notifying", "entering", "marking", "transmitting", "sending", "issuing", "connecting", or "communicating" with regard to a destination or other subject may involve intervening action such as forwarding, copying, packaging, unpackaging, signaling, routing, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
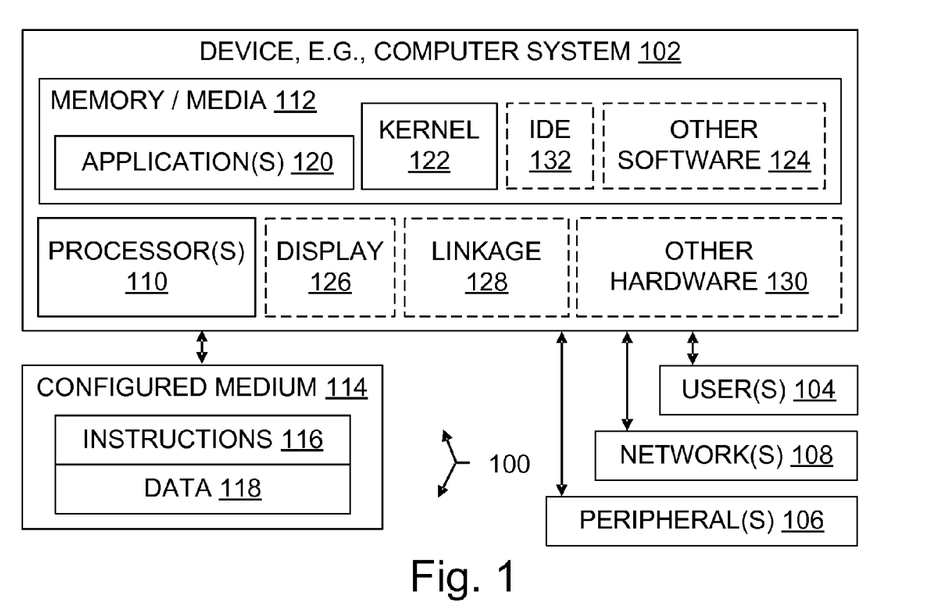
FIG. 1 is a block diagram illustrating a computer system having at least one processor and at least one memory, one or more applications, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media (as opposed to a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by sending, receiving, notifying, balancing, proxying, interfacing, binding, deployment, execution, modification, display, creation, loading, and/or other operations.

Applications 120 accessed through a web browser or otherwise, a kernel 122, other software (e.g., a web browser) 124, and other items shown in the Figures and/or discussed in the text may reside partially or entirely within one or more media 112, thereby configuring those media. An operating environment may also include a display 126, network linkage 128 hardware and software, and other hardware 130, such as buses, power supplies, and accelerators, for instance, in addition to processors 110 and memory 112.

A given operating environment 100 may include an Integrated Development Environment (IDE) 132 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
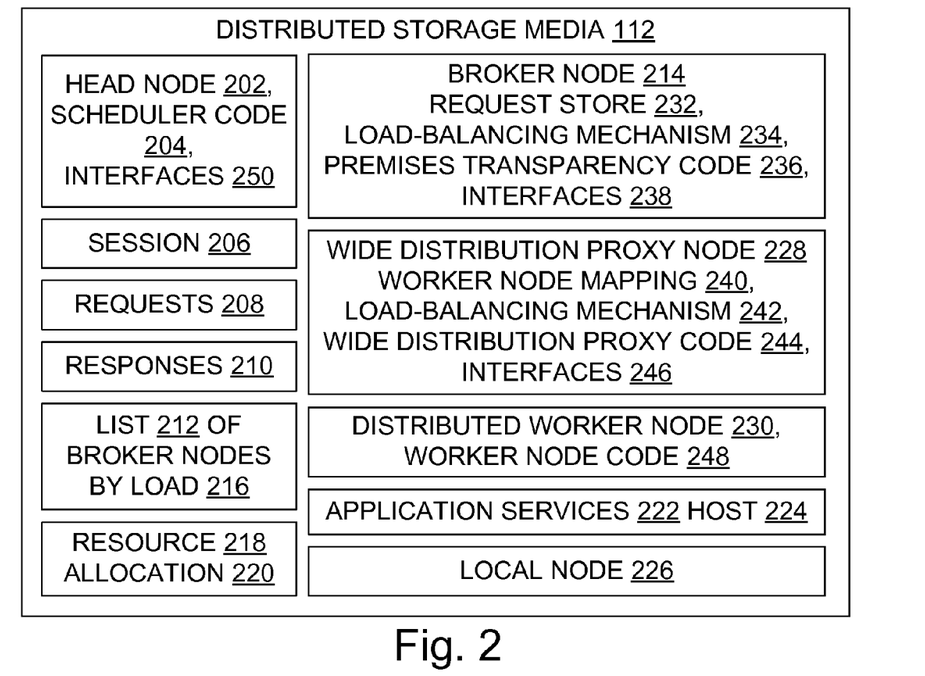
FIG. 2 is a block diagram illustrating aspects of a multilevel multipath widely distributed computational node architecture.

FIG. 2 further illustrates an architecture which is suitable for use with some embodiments. An application 120 communicates with a head node 202 which contains scheduler code 204 to start a session 206 in which the application sends computation requests 208 and gets computational results in responses 210. The head node 202 sends the application a list 212 of one or more broker nodes 214, listed in order according to their respective work load 216, using any familiar load metric(s). The scheduler code 204 allocates resources 218 (processing power, processing and storage memory, specified peripherals, etc.) for the session 206 in an allocation 220 (e.g., list, table, or other data structure), and launches the corresponding application service 222 hosts 224 on local nodes 226 and through proxy nodes 228 in the cloud on worker nodes 230.

In the illustrated embodiments, each broker node 214 includes or otherwise has access to a request store 232 and a load-balancing mechanism 234. Premises transparency code 236 on the broker node communicates with applications 120, the head node 202, and one or more proxy nodes 228 through one or more interfaces 238. Each proxy node 228 includes or otherwise has access to a logical-physical node mapping 240 and a load-balancing mechanism 242 (which may operate differently than and/or use different balancing criteria than, the broker node load-balancing mechanism 234). Wide distribution (e.g., cloud or multinetwork) proxy code 244 on the proxy node communicates with a broker node and with one or more worker nodes 230 through one or more interfaces 246. Worker node code 248 on each worker node 230 contains or communicates with application services 222, and communicates with the proxy node 228 to which the worker node is (self-)assigned.

With reference to FIGS. 1 and 2, some embodiments provide a computer system 102 with a logical processor 110 and a memory medium 112 configured by circuitry, firmware, and/or software to transform application requests into computational results by hybrid cloud/premise architecture operations as described herein. In some embodiments, a multilevel multipath widely distributed computational node system includes at least one broker node 214 having an application request-response interface 238, at least one application service host interface 238, and at least one wide distribution proxy interface 238. The broker node also has a logical processor 110 and a memory 112 in operable communication with the logical processor. A premises transparency code 236 residing in the memory has a request store 232 and a load-balancing mechanism 234.

The illustrated premises transparency code 236 is configured to receive requests 208 into the request store through the application request-response interface, to send corresponding load-balanced computation requests 208 through the application service host interface(s) and wide distribution proxy interface(s) (based on a prior allocation 220 of local and widely distributed node computational resources by a node other than the broker node), to receive computation responses 210 from local nodes 226 through the application service host interface(s) and from non-local nodes 230 through the wide distribution proxy interface(s), and to send the computation responses through the application request-response interface without thereby identifying the source of the computation responses as being from a local node versus a non-local node.

Some embodiments include a plurality of broker nodes 214, each node having a load 216. The system also includes a list 212 of broker nodes which resides in the system memory 112 and recites the broker nodes in order according to their respective loads. For instance, the list 212 may be sent from head node memory to an application 120.

In some embodiments, the system further includes at least one wide distribution proxy node 228 having a logical processor 110 and a memory 112 in operable communication with the logical processor. A wide distribution proxy code 244 residing in the memory has a broker premises transparency code interface 246, a plurality of worker node interfaces 246, and a logical-physical worker node mapping 240 of widely distributed worker nodes. The proxy code 244 is configured to receive computation requests 208 through the broker premises transparency code interface, to send the computation requests through the worker node interfaces using a logical-to-physical address aspect of mapping 240, to receive computation responses 210 through the worker node interfaces, and to send the computation responses through the broker premises transparency code interface.

In some embodiments, the system further includes a head node 202 having a logical processor 110 and a memory 112 in operable communication with the logical processor, an application session interface 250, and a scheduler code 204 residing in the memory. The scheduler code is configured to receive session requests 208 through the application session interface 250, to allocate resources 218 to a session, and to track resource usage by a session, without maintaining a list of worker node physical identifiers (which is maintained instead in mapping 240).

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
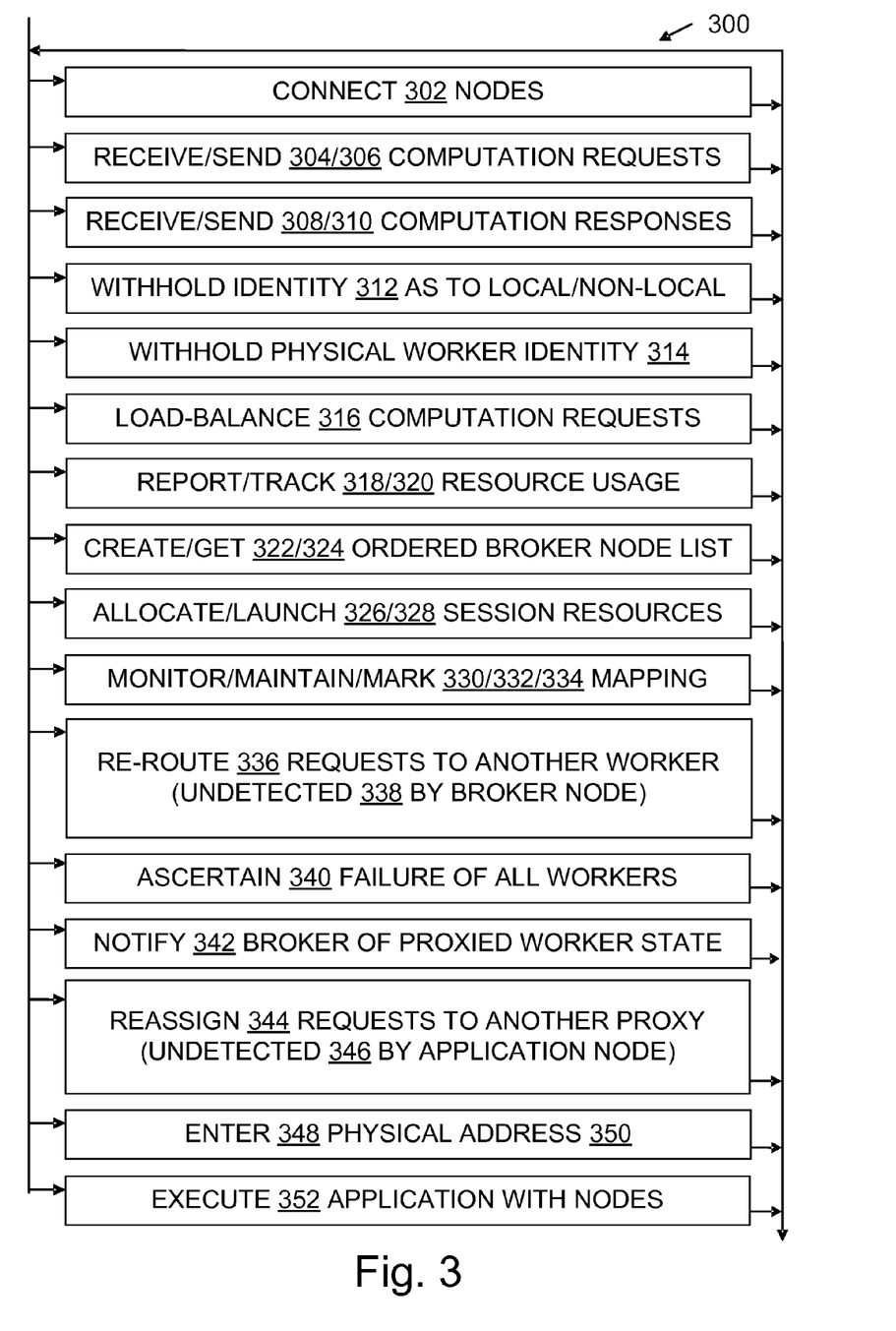
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by a head node 202, broker node(s) 214, and proxy node(s) 228 driven by requests 208 from an application 120 under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a node connecting step 302, an embodiment (or a user manipulating aspects of an embodiment) connects a broker node 214 to a head node 202, connects a broker node 214 to a proxy node 228, or otherwise establishes a connection capable of electronically carrying data and/or commands between two or more nodes shown in the Figures. Step 302 may be accomplished using network 108 connections, crossover cables, or other mechanisms, for example.

During a request receiving step 304, a node receives a request 208, e.g., by receiving in node memory 112 a request 208 sent over a network 108.

During a request sending step 306, a node sends a request 208, e.g., by sending a request 208 to another node over a network 108.

During a response receiving step 308, a node receives a response 210, e.g., by receiving in node memory a response 210 sent over a network.

During a response sending step 310, a node sends a response 210, e.g., by sending a response 210 to another node over a network 108.

During a location identity withholding step 312, a node sends 306, 310 or receives 304, 308 a request 208 or a response 210 without disclosing therein the identity of a source node, at least with respect to whether the source of the request 208 or response 210 in question is a local node 226 as opposed to being a non-local node 230, 228.

During a physical identity withholding step 314, a node sends 306, 310 or receives 304, 308 a request 208 or a response 210 without disclosing therein the physical identity of a source node, e.g., the MAC address, IP address, or other physical address of a source worker node 230.

During a load-balancing step 316, a broker node 214 or a proxy node 228 load-balances outgoing requests 208. Loads may be balanced using a round robin approach, a weighted approach, a random choice approach, and/or other familiar approaches, and may reflect familiar factors such as reported loads, recent response times, active/failed status, distance in hops, processing capabilities, and so on.

During a usage reporting step 318, a node reports usage of resources 218 to another node, e.g., by sending a summary of recent processor 110, memory 112, bandwidth, and/or other resource usage over a network 108 to the other node.

During a usage tracking step 320, a node receives a usage report sent 318 to it and incorporates the information therein with previously reported 318 usage, e.g., as a set of reports over time and/or as a greatest (or least) usage over a given reporting and tracking period.

During a broker list creating step 322, a node creates a list 212 of broker nodes with their corresponding loads 216, e.g., in a linked list, XML document, or other data structure. The list 212 may be ordered, e.g., reciting the broker node identities in order of increasing load.

During a broker list getting step 324, a node gets a list 212 of broker nodes with their corresponding loads 216, e.g., by receiving the list over a network 108.

During a resource allocating step 326, a node allocates resources 218 for a given session 206 by marking a representation of the resources as taken in an allocation 220 data structure, such as a list or table which shows how many virtual machines a customer will be billed for.

During a resource launching step 328, a node instructs other nodes to use their kernels 122 or hosts 224 to allocate resources 218 for a given session 206, e.g., by sending a launch request over a network 108 to specify virtual machine characteristics, processing power, memory capacity, and/or other resource values.

During a mapping monitoring step 330, a proxy node 228 monitors entries of a mapping 240 to identify any failed worker nodes 230, e.g., by looking for a timestamp which is further in the past than some specified timeout.

During a mapping maintaining step 332, a proxy node 228 provides memory 112 to hold a mapping 240, checks to see whether all worker nodes identified in the mapping 240 have failed, and/or otherwise supports and utilizes the mapping 240.

During a mapping marking step 334, a worker node 230 or a proxy node 228 marks an entry of a mapping 240, e.g., by entering 348 the worker node's physical address 350 in the mapping and/or by updating (which includes initially setting or modifying) a timestamp in the mapping.

During a request re-routing step 336, requests 208 initially sent to one worker node 230 are re-transmitted by a proxy node 228 to another worker node 230, because the first worker node has failed or is overloaded. This re-routing can be done without notifying the broker node, that is, undetected 338 by the broker node, because the broker node in some embodiments only sees logical names of worker nodes, and a given logical name may corresponds to several different physical computers over time.

During an all-failed ascertaining step 340, a proxy node ascertains that all worker nodes 230 listed in the proxy node's mapping 240 have failed, e.g., are not sending responses 210 within a specified timeout period, or have not updated their mapping entry timestamps within a specified timeout period.

During a broker notifying step 342, a proxy node 228 notifies a broker node 214 of a failure or error condition, e.g., by sending the broker a response indicating that all worker nodes 230 listed in the proxy's mapping 240 have failed.

During a request reassigning step 34, requests 208 initially sent to one proxy node 228 are re-transmitted by a broker node 214 to another proxy node 228, because all of the first proxy's worker nodes have failed. This reassigning can be done without notifying the application 120, that is, undetected 346 by the application's node, because the application node in some embodiments only sees requests and responses and broker node names, not the names of worker nodes or their proxy nodes.

During a physical address entering step 348, a worker node (or a proxy node acting on behalf of a worker node) enters a physical address 350 of the worker node (e.g., MAC address, IP address) in a proxy node's mapping 240.

During an application executing step 352, an application 120 executes at least in part by sending a request 208 to a broker node 214. More commonly, the application will send multiple requests 208 and receive back multiple corresponding responses 210, which contain data calculated at a worker node 230 and send to the application via a proxy node 228 and a broker node 214.

Figure 4:
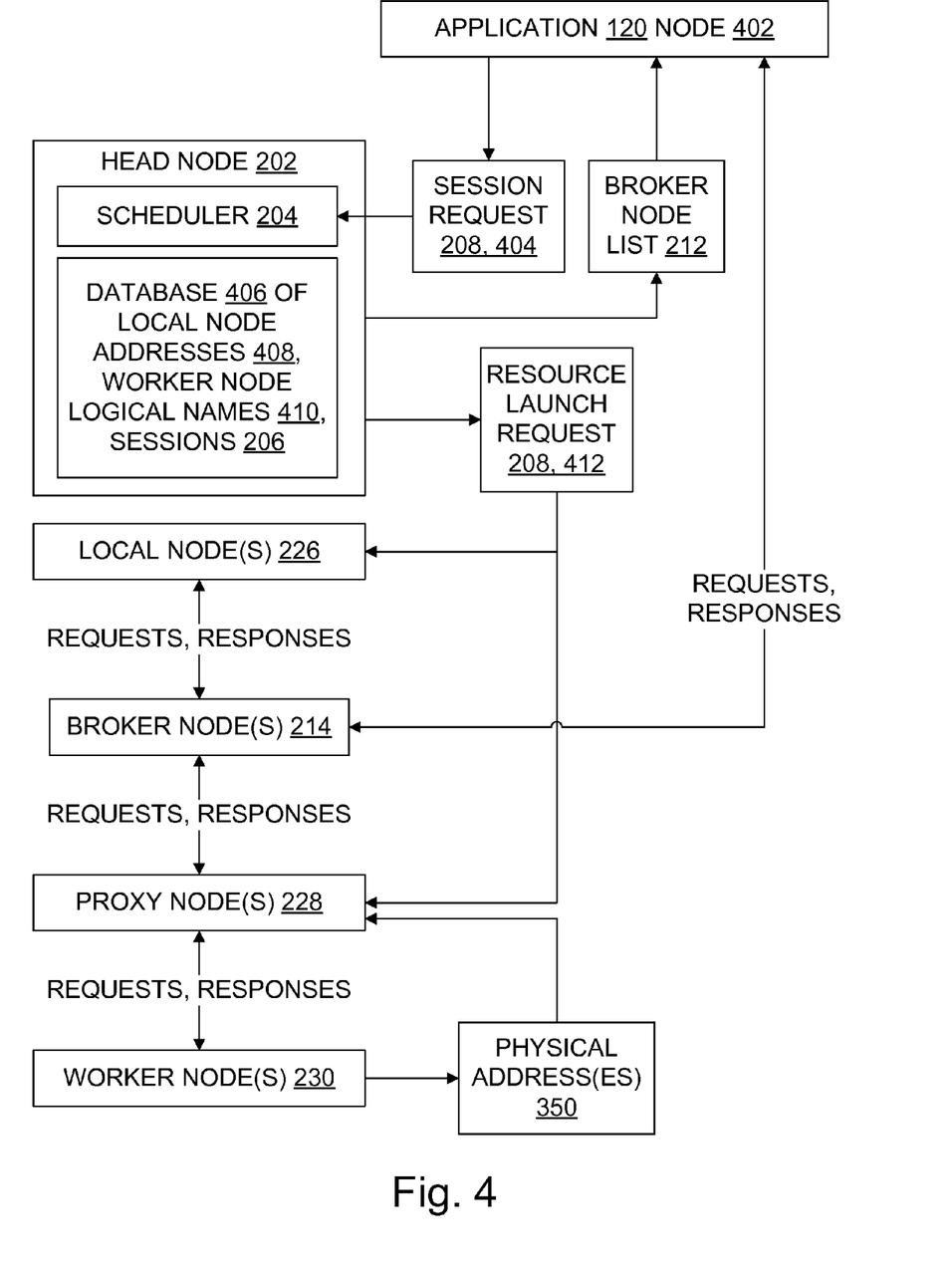
FIG. 4 is a data flow diagram illustrating multilevel multipath widely distributed computation in an example architecture.

FIG. 4 further illustrates aspects of some embodiments. An application 120 running on a laptop, workstation, mobile phone, or other application node 402 sends a session request 404 to a head node 202 and receives back a list 212 of broker nodes that will receive computation requests from the application and send corresponding results in responses to the application. The head node includes, or has access to, a database 406 of local node 226 addresses 408, which are likely physical addresses but may include logical addresses. The database 406 also includes worker node logical names 410; worker node physical names are maintained in the proxy mappings 240. Proxy nodes 228 may also be identified in the database 406. The database 406 may also contain the current allocation 220 of resources for each session 206 being managed by the head node 202. The head node launches 328 resources by sending a request 412 to local nodes and proxy nodes (possibly via broker nodes).

The foregoing steps and their interrelationships are discussed in greater detail below, in connection with various embodiments.

Some embodiments provide a process for multilevel multipath widely distributed computational node management. The process includes connecting 302 a broker node 214 to at least one wide distribution proxy node 228, and also to at least one local node 226, and also to at least one application node 402. The broker node receives 304 multiple requests from the application node, and sends 306 corresponding computation requests to the wide distribution proxy node(s), and the local node(s) based on a prior allocation 220 of local and widely distributed node computational resources by a head node 202. The broker node receives 308 computation responses from the wide distribution proxy node(s) and the local node(s), and sends 310 the computation responses to the application node(s) without thereby identifying 312 the source of the computation responses as being from a local node versus a non-local node.

In some embodiments, the broker node load-balances 316 the computation requests sent to the wide distribution proxy node(s) and the local node(s), thereby distributing computational workload among those nodes according to at least one predetermined load-balancing criterion. In some, the relative loads of the proxy node(s) and the local nodes are unknown to the application node because that information is maintained only in the broker node and/or the head node, for example.

Some embodiments include connecting 302 the broker node to the head node 202. The head node has a scheduler 204, and the broker node reports 318 resource usage to the scheduler, which can then update the database 406 accordingly.

In some embodiments, the application node 402 gets 324 a list 212 of broker nodes in the order of least loaded broker node first.

Some embodiments include a scheduler 204 in a head node 202 allocating 326 resources for a session, and some include the head node 202 or another node launching 328 the resources. For example, some embodiments launch 328 an application service 222 resource on a local node 226, and some launch 328 an application service 222 resource on a widely distributed worker node 230.

In some embodiments, the wide distribution proxy node(s) 228 maintain 332 a mapping 240 of logical widely distributed worker nodes to physical widely distributed worker nodes, e.g., a mapping from logical names 410 seen by a broker node to physical addresses 350 of worker nodes. In some, the proxy node monitors 330 entries of the mapping 240 for heartbeats, and marks 334 an entry null after a given worker node 230 misses a specified number of heartbeats.

In some embodiments, proxy node(s) 228 receive 304 computation requests 208 from a broker node 214, send 306 the computation requests to worker nodes 230, receive 308 corresponding computation responses 210 from the worker nodes, and send 310 the computation responses to the broker node without thereby identifying 314 any particular widely distributed worker node as the source of a given computation response.

In some embodiments, at least one of the proxy nodes 228 re-routes 336 an unfulfilled computation request from a failed worker node to another worker node, and the re-routing is undetected 338 by the broker node. In some, a proxy node ascertains 340 that all worker nodes assigned to that proxy node have failed, and notifies 342 the broker node of their failure. Then the broker node reassigns 344 unfulfilled computation requests from that proxy node to another proxy node, and the reassigning is undetected 346 by the application node.

In some embodiments, a worker node 230 enters (marks 334) its own physical address 350 in a logical-physical worker node mapping 240 of worker nodes which is accessible to one of the proxy nodes 228.

Some embodiments include executing 352 an application 120 at least partially on widely distributed worker nodes 230 without modifying the application from a state in which the application was previously executed solely on local node(s) 226. For purposes of this execution 352, calculations done on other nodes in response to requests from the application are considered part of the execution.

Configured Media

Some embodiments include a configured computer-readable storage medium 112. Medium 112 may include disks (magnetic, optical, or otherwise), RAM, EEPROMS or other ROMs, and/or other configurable memory (as opposed to propagated signals). The storage medium which is configured may be in particular a removable storage medium 114 such as a CD, DVD, or flash memory. A general-purpose memory, which may be removable or not, and may be volatile or not, can be configured into an embodiment using items such as broker code 236, proxy code 244, a broker list 212, and/or a database 406, in the form of data 118 and instructions 116, read from a removable medium 114 and/or another source such as a network connection, to form a configured medium. The configured medium 112 is capable of causing a computer system to perform process steps for transforming data through requests 208 and responses 210 in hybrid or other computing architectures as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some embodiments provide an architectural mechanism for offloading calculations onto cloud worker nodes, and for spanning calculations between the on-premise nodes and cloud nodes, as illustrated in the Figures. Some embodiments include the following components having the specified characteristics; in other embodiments, the components and/or characteristics may vary, consistent with the teachings herein.

A head node 202 is the master node of a given cluster. There is one instance of the head node per cluster.

A scheduler 204 system service queues jobs (a.k.a. sessions), allocates resources to jobs, and tracks the life cycle and resource usage of jobs.

A node and job database 406 stores the addresses of on-premise nodes 226 and logical names of the cloud nodes 214, 228, 230 and jobs.

A broker node 214 hosts compute nodes 226, 228.

A broker code 236 system service stores and load-balances requests across multiple compute nodes and cloud nodes.

A service host 224 is a program that hosts the application services 222 that perform computations on behalf of the application.

A web role proxy code 244 is a proxy program that performs cloud node 230 deployment, request 208 forwarding and responses 210 gathering.

A worker code 248 is a cloud worker role that hosts the application services that perform computation.

In some embodiments, the steps for a cloud burst mechanism are as follows.

Step 1: An application 120 creates a session job by sending a request 404 to the head node 202, and gets 324 a list of broker nodes in order of least loaded node first.

Step 2: The job scheduler 204 allocates 326 the resources for the session job and launches 328 them on the compute nodes 226, as well as on the cloud nodes 230.

Step 3: The application picks the first node in the broker node list 212 and sends 306 requests to the broker node. The broker node sends requests to the cloud proxy node, which in turn sends the requests to the worker nodes. The worker node 230 invokes the application services 222, processes the request and returns the responses to the proxy, which in turn returns results in response(s) to the broker. The application 120 makes calls to get the responses from the broker node. The application does not know whether the requests are processed on the compute nodes or the cloud nodes and as such, the applications can be moved to cloud execution 352 without any modifications.

Some embodiments provide a mechanism for mapping logical to physical cloud nodes which is consistent with the following.

Cloud nodes 228, 230 are stateless and they may come and go. If the scheduler were to maintain a list of the cloud nodes, the updates would be made across the cloud and the on-premise world, over the internet and in so doing might lead to race conditions. Instead, some embodiments maintain 332 logical to physical node mappings 240. The scheduler 204 maintains a list of logical nodes that correspond to the purchased (allocated) resources 218. The proxy and worker maintain the logical to physical node mapping, as is illustrated in the following steps.

Step 1: After the architecture's deployment, the workers 248 are installed on the cloud nodes 230. The logical to physical node mapping database contains contents such as the following:

| Logical Nodes | Physical Nodes | Update timestamp |
| --- | --- | --- |
| Cloud01 | NULL | Timestamp.NULL |
| Cloud02 | NULL | Timestamp.NULL |
| Cloud03 | NULL | Timestamp.NULL |

Step 2: When a worker, say Worker01, starts up, it finds the first row that has a NULL physical node column, locks that row, and updates the row similar to the following:

| Logical Nodes | Physical Nodes | Update timestamp |
|---|---|---|
| Cloud01 | Worker01 | 09/10/2010 5:10PM |
| Cloud02 | NULL | Timestamp.NULL |
| Cloud03 | NULL | Timestamp.NULL |

In these embodiments, the worker does the update using a cloud's atomic lock and update mechanism to avoid race conditions. As other nodes start up, the table will eventually be filled with physical nodes.

The request 208 that arrives at a proxy contains the logical node names. The proxy looks up the logical node in the mapping table to find the corresponding physical node address 350, and dispatches the request to the worker that is running on the addressed node.

Some embodiments provide a mechanism such as the following for recovering from fatal cloud node failures. Workers will periodically update (mark 334) the timestamp of the corresponding rows in the logical to physical node mapping table. If a worker node goes down, the worker's timestamp will not be updated. The proxy monitors 330 these entries and if a physical node is seen to miss three heartbeats (for example; the timeout value may vary), then the node will be marked as NULL.

A cloud fabric will re-allocate a node in the same fabric or on a different fabric and re-start a new worker 248 instance. The worker will find the first row that has the NULL and update its physical addresses. The proxy may also recover unfulfilled requests from the failure by re-routing 336.

Some embodiments provide a mechanism for multiple level request retry. When a cloud node goes down, the proxy will re-route 336 the unfulfilled requests that are being processed by the failed node to other healthy workers. This is the first level retry. However, if all the worker instances hanging off of a proxy become unreachable, then the proxy will raise an EndpointUnreachable exception (for example; the exact exception or notification mechanism may vary) to notify 342 the broker node. The broker node will reassign 344 unfulfilled requests, in a retry by sending the requests either to the on-premise nodes 226 or to active cloud nodes.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A multilevel multipath widely distributed computational node system comprising:
at least one broker node having an application request-response interface, at least one application service host interface, and at least one wide distribution proxy interface, the broker node also having a logical processor and a memory in operable communication with the logical processor; and
a premises transparency code residing in the memory and having a request store and a load-balancing mechanism, the premises transparency code configured to receive requests into the request store through the application request-response interface, to send corresponding load-balanced computation requests to local nodes through the application service host interface(s) and to non-local nodes through the wide distribution proxy interface(s) based on a prior allocation of local and widely distributed node computational resources by a node other than the broker node, to receive computation responses from local nodes through the application service host interface(s) and from non-local nodes through the wide distribution proxy interface(s), and to send the computation responses through the application request-response interface without thereby identifying the source of the computation responses as being from a local node versus a non-local node.

2. The system of claim 1, wherein the system further comprises at least one wide distribution proxy node having a logical processor and a memory in operable communication with the logical processor, a wide distribution proxy code residing in the memory and having a broker premises transparency code interface, a plurality of worker node interfaces, and a logical-physical worker node mapping of widely distributed worker nodes, the wide distribution proxy code configured to receive computation requests through the broker premises transparency code interface, to send the computation requests through the worker node interfaces using the mapping, to receive computation responses through the worker node interfaces, and to send the computation responses through the broker premises transparency code interface.

3. The system of claim 1, wherein the system comprises a plurality of such broker nodes, each node having a load, and the system also comprises a list of broker nodes, the list residing in the memory and reciting the broker nodes in order according to their respective loads.

4. The system of claim 1, wherein the system further comprises a head node having a logical processor and a memory in operable communication with the logical processor, an application session interface, and a scheduler code residing in the memory, the scheduler code configured to receive session requests through the application session interface, to allocate resources to a session, and to track resource usage by a session, without maintaining a list of worker node physical identifiers.

5. The system of claim 1, wherein the system comprises a plurality of such broker nodes, each node having a load, and the system further comprises:
a head node having a logical processor and a memory in operable communication with the logical processor, an application session interface, and a scheduler code residing in the memory, the scheduler code configured to receive session requests through the application session interface, to allocate resources to a session, and to track resource usage by a session, a list of broker nodes also residing in the memory and reciting the broker nodes in order according to their respective loads; and
at least one wide distribution proxy node having a logical processor and a memory in operable communication with the logical processor, a wide distribution proxy code residing in the memory and having a broker premises transparency code interface, a plurality of worker node interfaces, and a logical-physical worker node mapping of widely distributed worker nodes, the wide distribution proxy code configured to receive computation requests through the broker premises transparency code interface, to send the computation requests through the worker node interfaces using the mapping, to receive computation responses through the worker node interfaces, and to send the computation responses through the broker premises transparency code interface.

6. A process for multilevel multipath widely distributed computational node management, the process comprising the steps of:
connecting a broker node to at least one wide distribution proxy node, and also to at least one local node, and also to at least one application node;
the broker node receiving multiple requests from the application node;
the broker node sending corresponding computation requests to the wide distribution proxy node(s), and the local node(s) based on a prior allocation of local and widely distributed node computational resources by a head node;
the broker node receiving computation responses from the wide distribution proxy node(s) and the local node(s);
the broker node sending the computation responses to the application node(s) without thereby identifying the source of the computation responses as being from a local node versus a non-local node.

7. The process of claim 6, further comprising the broker node load-balancing the computation requests sent to the wide distribution proxy node(s) and the local node(s), thereby distributing computational workload among those nodes according to at least one predetermined load-balancing criterion.

8. The process of claim 6, further comprising connecting the broker node to the head node, the head node having a scheduler, and the broker node reporting resource usage to the scheduler.

9. The process of claim 6, further comprising the application node getting a list of broker nodes in the order of least loaded broker node first.

10. The process of claim 6, further comprising a scheduler in a head node allocating resources for a session and launching the resources.

11. The process of claim 6, further comprising the wide distribution proxy node(s) maintaining a mapping of logical widely distributed worker nodes to physical widely distributed worker nodes.

12. The process of claim 11, further comprising the wide distribution proxy node monitoring entries of the mapping for heartbeats, and marking an entry null after a given widely distributed worker node misses a specified number of heartbeats.

13. The process of claim 6, further comprising the wide distribution proxy node(s) receiving computation requests from the broker node, sending the computation requests to widely distributed worker nodes, receiving computation responses from the widely distributed worker nodes, and sending the computation responses to the broker node without thereby identifying any particular widely distributed worker node as the source of a given computation response.

14. A computer-readable distributed storage medium configured with data and with instructions that when executed by processors cause the processors to perform a process for process for multilevel multipath widely distributed computational node management, the process comprising the steps of:
a broker node receiving multiple requests from an application node;
the broker node sending corresponding computation requests to wide distribution proxy node(s), and to local nodes, which were previously allocated by a head node;
the wide distribution proxy node(s) receiving computation requests from the broker node, sending the computation requests to widely distributed worker nodes, receiving computation responses from the widely distributed worker nodes, and sending the computation responses to the broker node without thereby identifying any particular widely distributed worker node as the source of a given computation response;
the broker node receiving computation responses from the wide distribution proxy node(s) and the local nodes; and
the broker node sending the computation responses to the application node without thereby identifying the source of the computation responses as being from a local node versus a widely distributed worker node.

15. The configured medium of claim 14, wherein the process further comprises at least one of the following:
launching an application service resource on a local node;
launching an application service resource on a widely distributed worker node.

16. The configured medium of claim 14, wherein the process further comprises the broker node load-balancing the computation requests sent to the wide distribution proxy node(s) and the local nodes, thereby distributing computational workload among those nodes, and wherein the relative loads of the wide distribution proxy node(s) and the local nodes are unknown to the application node.

17. The configured medium of claim 14, wherein the process further comprises at least one of the wide distribution proxy nodes re-routing an unfulfilled computation request from a failed widely distributed worker node to another widely distributed worker node, and wherein the re-routing is undetected by the broker node.

18. The configured medium of claim 14, wherein the process further comprises at least one of the wide distribution proxy nodes ascertaining that all widely distributed worker nodes assigned to that wide distribution proxy node have failed, and notifying the broker node of their failure, and the broker node reassigning unfulfilled computation requests from that wide distribution proxy node to another wide distribution proxy node, and wherein the reassigning is undetected by the application node.

19. The configured medium of claim 14, wherein the process further comprises a widely distributed worker node entering its own physical address in a logical-physical worker node mapping of widely distributed worker nodes which is accessible to one of the wide distribution proxy nodes.

20. The configured medium of claim 14, wherein the process further comprises executing an application at least partially on widely distributed worker nodes without modifying the application from a state in which the application was previously executed solely on local node(s).

\* \* \* \* \*